(12) United States Patent
Comet (10) Patent No.: US 10,537,758 B2
(45) Date of Patent: Jan. 21, 2020

(54) ENERGY DISSIPATING TOUCH FASTENER LINKS

(71) Applicant: Velcro BVBA, Deinze (BE)

(72) Inventor: Carlos Sáez Comet, Barcelona (ES)

(73) Assignee: Velcro BVBA, Deinze (BE)

( * ) Notice: Subject to any disclaimer, the term of this patent is extended or adjusted under 35 U.S.C. 154(b) by 98 days.

(21) Appl. No.: 15/840,196

(22) Filed: Dec. 13, 2017

(65) Prior Publication Data

US 2018/0178047 A1    Jun. 28, 2018

Related U.S. Application Data (60) Provisional application No. 62/437,764, filed on Dec. 22, 2016.

(51) Int. Cl.
*A62B 35/04* (2006.01)
*F16F 7/00* (2006.01)
(Continued)

(52) U.S. Cl.
CPC .......... *A62B 35/04* (2013.01); *A44B 18/0015* (2013.01); *A44B 18/0084* (2013.01); *F16F 7/006* (2013.01); *F16F 7/08* (2013.01)

(58) Field of Classification Search
CPC . A62B 35/04; A44B 18/0015; A44B 18/0084; F16F 7/08
See application file for complete search history.

(56) References Cited

U.S. PATENT DOCUMENTS 1,935,339 A    11/1933  Tricau
3,444,957 A *   5/1969  Ervin, Jr. ............... A62B 35/04
                                                     182/3
(Continued)

FOREIGN PATENT DOCUMENTS

DE          4005563        8/1991
DE      10 2013 017680    4/2015
(Continued)

OTHER PUBLICATIONS

PCT Written Opinion of the International Preliminary Examining Authority in International Application No. PCT/EP2017/0834, dated Dec. 10, 2018, 16 pages.
(Continued)

*Primary Examiner* — Colleen M Chavchavadze
(74) *Attorney, Agent, or Firm* — Fish & Richardson P.C.

(57) ABSTRACT

An energy dissipating link for a tether includes: an elongated base having opposite, first and second end portions; a first touch fastener permanently coupled to the base proximate the first base end portion; and a second touch fastener permanently coupled to the base proximate the second base end portion. The second touch fastener is engageable with the first touch fastener to form a releasable closure defining a shear plane. With the first and second touch fasteners engaged to transmit a tensile load between the first and second end portions, and with the engaged touch fasteners loaded in shear in the shear plane, the base includes a longitudinally slack idler section between the first and second end portions. The idler section of the base is configured to transmit tensile load upon an energy-dissipating shear disengagement of the first and second touch fasteners by a tensile overload.

20 Claims, 7 Drawing Sheets

(51) Int. Cl.
*A44B 18/00* (2006.01)
*F16F 7/08* (2006.01)

(56) References Cited

U.S. PATENT DOCUMENTS

| | | | | |
|---|---|---|---|---|
| 3,804,698 | A | | 4/1974 | Kinloch |
| 3,937,407 | A | | 2/1976 | Matsuo |
| 4,100,996 | A | * | 7/1978 | Sharp ................... A62B 35/04 182/3 |
| 4,271,566 | A | | 6/1981 | Perina |
| 4,446,944 | A | * | 5/1984 | Forrest .................. A62B 35/04 182/3 |
| 4,538,702 | A | | 9/1985 | Wolner |
| 4,794,028 | A | | 12/1988 | Fischer |
| 5,090,503 | A | * | 2/1992 | Bell ....................... A62B 35/04 182/5 |
| 5,113,981 | A | | 5/1992 | Lantz |
| 5,174,410 | A | * | 12/1992 | Casebolt ............... A62B 35/04 182/3 |
| 5,238,279 | A | | 8/1993 | Anteau |
| 5,316,102 | A | * | 5/1994 | Bell ..................... E04G 21/3261 182/3 |
| 5,529,343 | A | * | 6/1996 | Klink ..................... B60R 22/16 280/801.1 |
| 5,598,900 | A | * | 2/1997 | O'Rourke ........... A62B 35/0056 182/18 |
| 5,609,365 | A | | 3/1997 | Holka |
| 5,658,012 | A | * | 8/1997 | Villarreal ................ B60R 22/16 280/805 |
| 5,960,480 | A | * | 10/1999 | Neustater ............... A62B 35/04 182/3 |
| 5,996,189 | A | | 12/1999 | Wang |
| 5,997,981 | A | * | 12/1999 | McCormack ...... A44B 18/0011 428/99 |
| 6,299,040 | B1 | * | 10/2001 | Matias ..................... A45F 5/00 224/254 |
| 6,533,066 | B1 | * | 3/2003 | O'Dell ................... A62B 35/04 182/3 |
| 6,589,638 | B1 | * | 7/2003 | McCormack ...... A44B 18/0011 428/198 |
| 6,648,101 | B2 | * | 11/2003 | Kurtgis .............. A62B 35/0075 182/145 |
| 6,698,544 | B2 | * | 3/2004 | Kurtgis .............. A62B 35/0075 182/145 |
| 6,883,640 | B2 | * | 4/2005 | Kurtgis .............. A62B 35/0075 182/3 |
| 6,960,314 | B2 | | 11/2005 | Lacey et al. |
| 6,990,928 | B2 | * | 1/2006 | Kurtgis ................... B64D 1/12 119/770 |
| 7,106,205 | B2 | * | 9/2006 | Graef ................. A62B 35/0012 182/3 |
| 7,146,690 | B2 | * | 12/2006 | Stanford, Jr. ...... A44B 18/0003 24/451 |
| 7,237,650 | B2 | * | 7/2007 | Casebolt ............ A62B 35/0093 182/231 |
| 7,392,881 | B1 | * | 7/2008 | Choate .................. A62B 35/04 182/3 |
| 7,650,717 | B2 | * | 1/2010 | Drayer ................... A01G 17/10 47/32.5 |
| 7,726,350 | B2 | * | 6/2010 | Jennings ................ A62B 35/04 139/383 B |
| 7,716,792 | B2 | | 8/2010 | Clarner |
| 7,909,137 | B2 | | 3/2011 | Green |
| 8,267,471 | B2 | | 9/2012 | Reel |
| 8,375,529 | B1 | * | 2/2013 | Duffy ................. A44B 18/0053 24/452 |
| 8,584,799 | B1 | * | 11/2013 | Dennington ........... A62B 35/04 182/3 |
| 8,701,826 | B2 | | 4/2014 | Smith et al. |
| 9,958,070 | B2 | * | 5/2018 | Cornu ..................... F16J 15/04 |
| 10,125,837 | B1 | * | 11/2018 | Fegley ................... F16F 7/006 |
| 10,154,707 | B2 | * | 12/2018 | Prest ..................... A44B 18/00 |
| 2006/0216461 | A1 | * | 9/2006 | Tachauer ........... A44B 18/0049 428/99 |
| 2018/0180130 | A1 | * | 6/2018 | Comet ............... A44B 18/0015 |

FOREIGN PATENT DOCUMENTS

| | | |
|---|---|---|
| FR | 2596092 | 9/1987 |
| FR | 2870686 | 12/2005 |
| FR | 2952654 | 5/2011 |
| GB | 2136915 | 9/1984 |
| JP | S5576235 | 6/1980 |

OTHER PUBLICATIONS

International Search Report and Written Opinion in International Application No. PCT/EP2017/083412, dated May 4, 2018, 18 pages.

International Search Report and Written Opinion in International Application No. PCT/EP2017/083277, dated Apr. 20, 2018, 19 pages.

* cited by examiner

ENERGY DISSIPATING TOUCH FASTENER LINKS

TECHNICAL FIELD

This specification generally relates to energy dissipating links formed by releasably engageable touch fasteners.

BACKGROUND

Mechanical devices for dissipating kinetic energy are used as shock absorbers and/or brakes in a wide variety of fields. One particular field where energy dissipating devices are employed is fall prevention. In fact, safety regulations in many jurisdictions require fall prevention systems to be employed for persons working in elevated environments. Fall prevention systems are also used by rock and wall climbing enthusiasts. Energy dissipators in the context of climbing activities are typically incorporated in safety lines that connect the climber to a stable structure. The safety line connection effectively protects the climber from a prolonged free fall and impact with the ground. Still, the effect of gravity on even a short free fall without impact may exert an injurious arresting force on the climber when the fall is abruptly halted by the safety line. Energy dissipators are specifically designed to mitigate this arresting force. The vast majority of energy dissipating devices currently in use involve one or more pieces of flexible material that have been arranged in a folded, overlapping configuration and connected (e.g., stitched, woven, or loomed) together at certain discrete points. These devices dissipate kinetic energy in the safety line by using tensile force in the line to instigate the breaking/tearing of the discrete connection points.

SUMMARY

In one aspect, an energy dissipating link for a tether includes: an elongated base having opposite, first and second end portions; a first touch fastener permanently coupled to the base proximate the first base end portion; and a second touch fastener permanently coupled to the base proximate the second base end portion. The second touch fastener is engageable with the first touch fastener to form a releasable closure defining a shear plane. With the first and second touch fasteners engaged to transmit a tensile load between the first and second end portions, and with the engaged touch fasteners loaded in shear in the shear plane, the base includes a longitudinally slack idler section between the first and second end portions. The idler section of the base is configured to transmit tensile load upon an energy-dissipating shear disengagement of the first and second touch fasteners by a tensile overload.

In some examples, the shear plane extends parallel to at least a portion of the base.

In some examples, the longitudinally slack idler section of the base at least partially longitudinally overlaps the releasable closure.

In some examples, the first touch fastener includes an array of discrete fastening elements, each fastening element including an upstanding stem extending outwardly from the base and a head extending integrally from a distal end of the stem to a tip. In some examples, the second touch fastener includes a field of loops, and the heads of the fastening elements include a lower surface forming a crook for retaining the loops. In some examples, a majority of the discrete fastening elements include one-way hooks, with the head of each fastening element of the majority extending forward from the stem in the same direction.

In some examples, a physical characteristic of at least one of the first and second touch fasteners varies along the shear plane, such that the shear strength of the closure remains at least substantially constant throughout a portion of the energy-dissipating shear disengagement. In some examples, the physical characteristic includes at least one of density or tenacity of engagement.

In some examples, the idler section of the base is separate and distinct from the first and second touch fasteners.

In some examples, one longitudinal end of the first touch fastener is directly attached to the base and the remainder of the first touch fastener is free standing relative to the base, such that, under the tensile overload between the first and second end portions of the base, the energy-dissipating shear disengagement includes an opposite free-standing end of the first touch fastener being disengaged by shear from the second touch fastener. In some examples, two longitudinal ends of the second touch fastener are directly attached to the base.

In some examples, the closure formed by engagement of the first and second touch fasteners is a first closure, and the link further includes a second releasable closure carried on the base and separated from the first closure.

In some examples, the shear plane includes a first shear plane, and the link further includes one or more additional touch fasteners forming at least a second shear plane of the closure, the shear planes arranged in parallel, such that, under the tensile overload between the first and second end portions of the base, the engaged fastening components are released simultaneously. In some examples, the idler section of the base at least partially longitudinally overlaps both the first and second closures.

In another aspect, a flexible energy dissipating link includes: an elongated and flexible base having first and second longitudinal end portions; and a plurality of flexible touch fasteners coupled to the flexible base between the first and second end portions, each touch fastener engaged with at least one other of the touch fasteners to define a closure having multiple, parallel, longitudinally overlapping shear planes in which the engaged touch fasteners are simultaneously loaded in response to a tensile load applied along the link at the first and second end portions.

In some examples, each of the plurality of touch fasteners is directly attached to the base.

In some examples, at least one of the plurality of touch fasteners includes a double-sided structure carrying fastening elements on both an upper and lower planar face. the fastening elements on the upper and lower planar faces include fields of discrete hook structures including an upstanding stem extending outwardly from the base and a head extending integrally from a distal end of the stem to a tip. In some examples, a majority of the discrete hook structures include one-way hooks, with the head of each hook structure of the majority extending forward from the stem in the same direction. In some examples, the fastening elements on the upper and lower planar faces include a field of hook-engageable loops.

In some examples, a first of the plurality of touch fasteners includes an array of discrete fastening elements, each fastening element including an upstanding stem extending outwardly from the base and a head extending integrally from a distal end of the stem to a tip. In some examples, a second of the plurality of touch fasteners includes a field of loops, and the heads of the fastening elements include a lower surface forming a crook for retaining the loops. In some examples, the fastening elements include one-way hooks, with the head of each fastening element extending forward from the stem in the same direction.

In some examples, a physical characteristic of at least one of the plurality of touch fasteners varies along a direction of the shear planes, such that the shear strength of the closure remains at least substantially constant throughout a portion of an energy-dissipating shear disengagement of the touch fasteners by a tensile overload. In some examples, the physical characteristic includes at least one of density or tenacity of engagement.

In some examples, one longitudinal end of a first of the plurality of touch fasteners is directly attached to the base and the remainder of the first touch fastener is free standing relative to the base, such that, under a tensile overload between the first and second end portions of the base, an opposite free-standing end of the first touch fastener is disengaged by shear from a second of the plurality of touch fasteners. In some examples, two longitudinal ends of the second touch fastener are directly attached to the base.

In some examples, the closure is a first closure, and the link further includes a second releasable closure carried on the base and separated from the first closure.

In yet another aspect, an energy dissipating link for a tether includes: an elongated and flexible base having opposite, first and second end portions separated from one another by a longitudinal distance along the base; a first touch fastener permanently attached to the base solely by a first coupling located entirely within the first end portion of the base; and a second touch fastening component permanently attached to the base solely by a second coupling located entirely within the second end portion of the base. The second touch fastener is engaged with the first touch fastener to form a releasable closure including a longitudinal shear plane.

In some examples, the first touch fastener includes an array of discrete fastening elements, each fastening element including an upstanding stem extending outwardly from the base and a head extending integrally from a distal end of the stem to a tip. In some examples, the second touch fastener includes a field of loops, and the heads of the fastening elements include a lower surface forming a crook for retaining the loops. In some examples, a majority of the discrete fastening elements include one-way hooks, with the head of each fastening element of the majority extending forward from the stem in the same direction.

In some examples, a physical characteristic of at least one of the first and second touch fasteners varies along the shear plane, such that the shear strength of the closure remains at least substantially constant throughout a portion of an energy-dissipating shear disengagement. In some examples, the physical characteristic includes at least one of density or tenacity of engagement of the touch fasteners by a tensile overload.

In some examples, one longitudinal end of the first touch fastener is directly attached to the base and the remainder of the first touch fastener is free standing relative to the base, such that, under a tensile overload between the first and second end portions of the base, an opposite free-standing end of first touch fastener is disengaged by shear from the second touch fastener. In some examples, two longitudinal ends of the second touch fastener are directly attached to the base.

In some examples, the closure formed by engagement of the first and second touch fasteners is a first closure, and the link further includes a second releasable closure carried on the base and separated from the first closure.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Certain aspects of the drawings may be exaggerated to better show the features, process steps, and results. Like reference numbers and designations in the various drawings may indicate like elements.

DETAILED DESCRIPTION

Figure 1A:
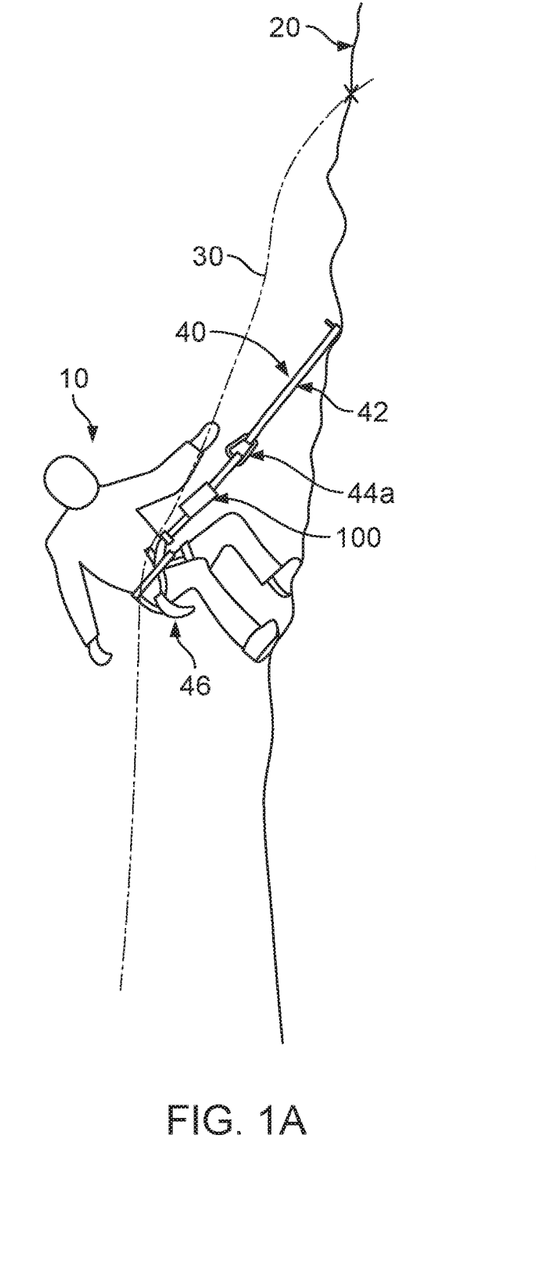
FIG. 1A is an illustrative diagram illustrating use of a fall arresting system including an energy dissipating link in accordance with one or more embodiments of the present disclosure.
Figure 1B:
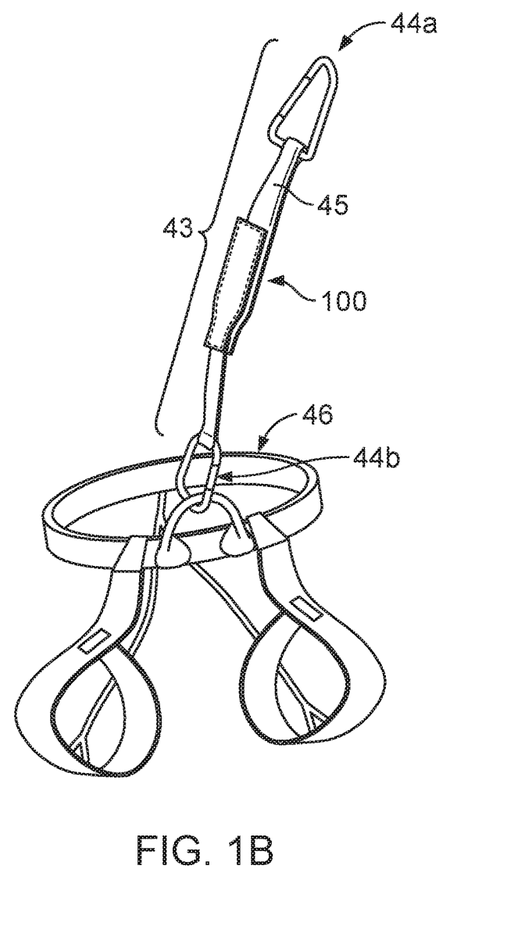
FIG. 1B is an isolated diagram of the fall arresting system of FIG. 1A.

FIGS. 1A and 1B illustrate a climber 10 executing a controlled ascent along the side of a rock structure 20 using a guide rope 30 and a fall arresting system 40. Fall arresting system 40 features a safety line 42 and a tether 43 (often called a "lanyard"). Safety line 42 is anchored at one end to rock structure 20. Tether 43 includes a pair of carabiners 44a,b, a flexible belt 45, and an energy dissipating link 100 (often called a "shock absorber"). Carabiner 44a couples tether 43 to the free standing end of safety line 42, indirectly coupling the tether to the anchor point of rock structure 20. Carabiner 44b couples tether 43 to a safety harness 46 worn by climber 10. Thus, the climber is secured to the rock structure via the safety line and tether components. Link 100 of tether 43 is located on the tether's flexible belt 45 between carabiners 44a,b. In some examples, the energy dissipating link and the flexible belt are separate and independent components attached to one another by a mechanical coupling (e.g., stitching, heat welding, adhesive, etc.). In some other examples, these components are integrally formed as a single device.

Fall arresting system 40 is designed to limit the free fall distance of climber 10 should the climber inadvertently lose hold of rock structure 20 and/or guide rope 30. Fall arresting system 40 is further designed to limit the maximum arrest force ("MAF") exerted on climber 10 to a tolerable level. The term "maximum arrest force" refers to the short duration, peak dynamic force acting on the climber's body through tension in the safety line and tether when free fall is halted abruptly. The MAF is directly related to the accumulation of kinetic energy during free fall. Link 100 is designed to limit the MAF by dissipating (or diverting) this free-fall kinetic energy from fall arresting system 40. As described below, link 100 features a plurality of mating touch fasteners that form one or more releasable closures. These mating touch fasteners are arranged to utilize the tension force transmitted along belt 45 during arrest to instigate disengagement. The term "touch fastener" as used in the present disclosure refers to a component that engages mechanically with (i.e., "fastens" to) another mating component, when the two components are placed into direct contact with one another. Various touch fastener configurations can be used in conjunction with the energy dissipating links described herein, including, but not limited to hook-and-loop, hook-and-pile, and hook-to-hook configurations.

Energy spent disengaging the touch-fastener closure is effectively removed from fall arresting system 40, and therefore lessens the MAF. More specifically, the mating touch fasteners are arranged such that the tensile load applied to the fall arresting system by the weight of the climber's body pulls apart (or "disengages") the fasteners in shear. Shear disengagement is characterized by a relative sliding motion between the fasteners along a defined plane (the "shear plane") that typically runs parallel to the base of the fasteners. One particular advantage that can be obtained by employing touch fasteners in this context is a relatively smooth disengagement during the fall arresting process. That is, because a closure formed between two touch fasteners typically involves the engagement of hundreds or thousands of individual fastening elements, the progressive disengagement of those elements is effectively continuous at a high level. In practice, this means that the user does not perceive individual micro shocks during a fall arrest, such as may be the case when discrete areas of breakable connections are used.

Figure 2A:
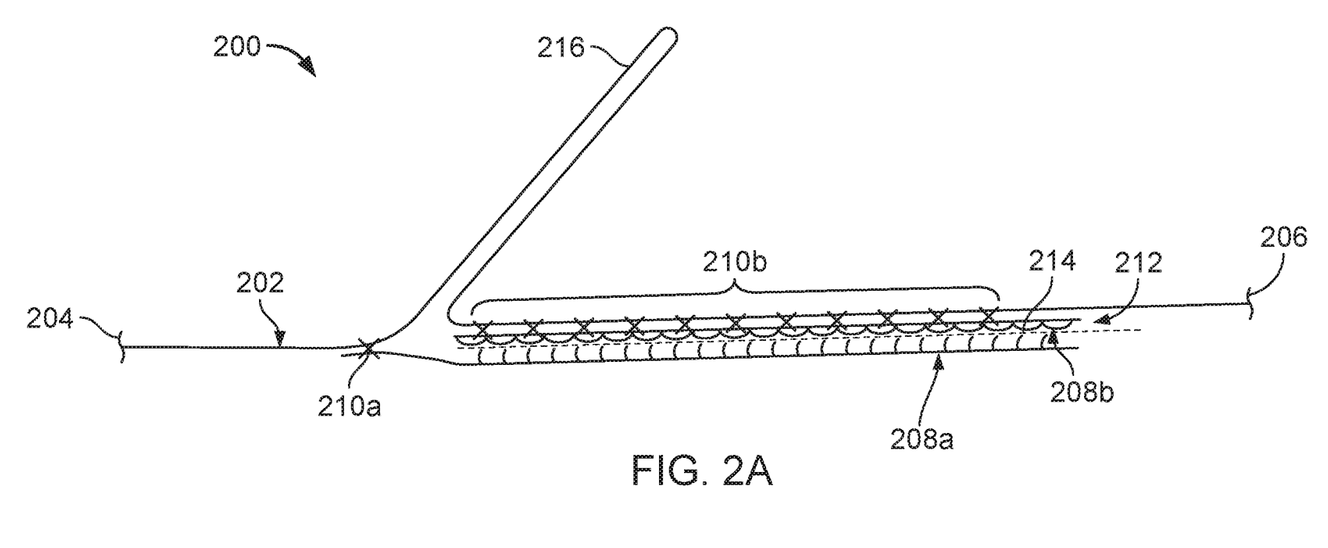
FIG. 2A is a cross-sectional diagrammatic side view of a first energy dissipating link.
Figure 2B:
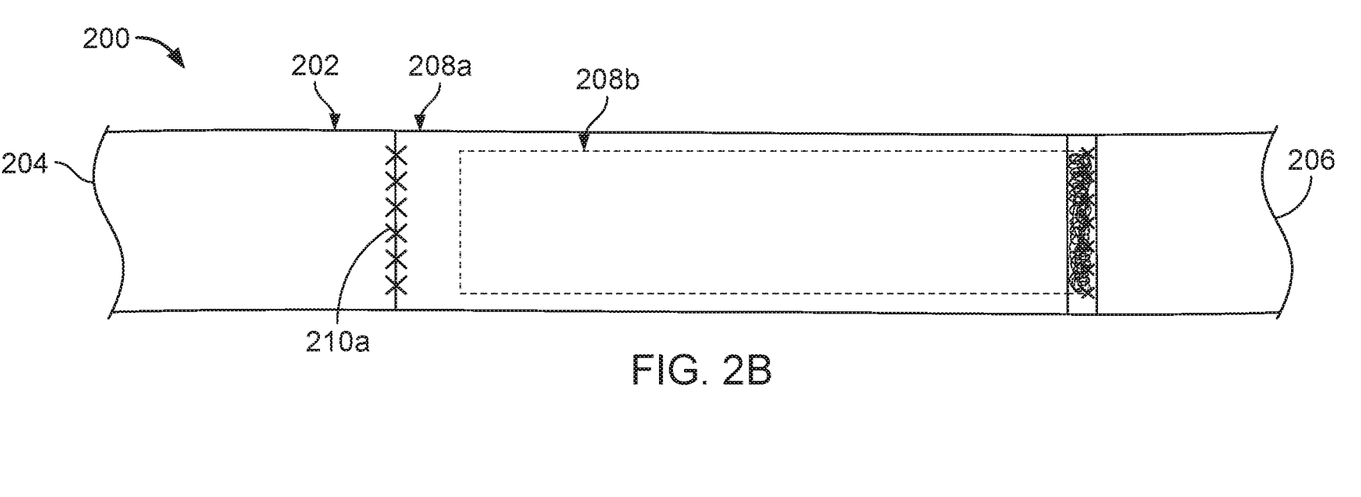
FIG. 2B is a bottom view of the energy dissipating link of FIG. 2A.

FIGS. 2A and 2B illustrate a first example energy dissipating link 200 including an elongated base 202 extending continuously between a first end portion 204 and a second end portion 206. As noted above, the end portions may be attached to, or integrated with, a flexible belt (e.g., flexible belt 45 of FIGS. 1A and 1B) that is coupled to an anchored safety line (e.g., safety line 42 of FIG. 1A). In some examples, base 202 is a relatively thin and flexible structure, which allows link 200 to be arranged into a compact package. Irrespective of form factor, however, base 202 is appropriately configured (with respect to, for example, material selection and manufacturing techniques) to provide sufficient tensile strength and dynamic load resiliency to prevent breakage during fall arrest.

Link 200 further includes a first touch fastener 208a and a second touch fastener 208b. As shown, first and second touch fasteners 208a,b are located on base 202, proximate first and second end portions 204,206, respectively. Each of touch fasteners 208a,b is permanently coupled to base 202. By "permanently coupled" we mean that the touch fasteners are carried by the base, and held in a fixed position thereto during use and operation of the energy dissipating link. Stated plainly, the touch fasteners are not intended to become detached from the base at any point. In this example, touch fasteners 208a,b are directly attached to the respective portions of base 202 by lines of stitching. In particular, a distal edge of first touch fastener 208a is attached to the first end portion 204 of base 202 by a narrow band of stitching 210a, leaving the remainder of the fastener free standing from the base. Second touch fastener 208b is attached to second end portion 206 of base 202 at both ends by a broad field of stitches 210b. The stitching configurations shown and described in this embodiment (and others) are merely exemplary, and not intended to be limiting. In fact, numerous other suitable techniques may also be used to facilitate a permanent coupling between the touch fasteners and the base at above-described locations (e.g., heat welding, adhesives, chemical bonding, etc.). Further, in some examples, the touch fasteners may be integrally formed with the base as a single, contiguous mass.

Touch fasteners 208a,b include respective fields or arrays of releasably engageable fastening elements. That is, the fastening elements of first touch fastener 208a are designed to mate with the fastening elements of second touch fastener 208b in a non-permanent fashion (as compared to the stitching that connects the touch fasteners to the base). In this example, first touch fastener 208a includes an array of discrete male fastening elements (e.g. hook structures), and second touch fastener 208b includes a field of loop structures designed to engage the male fastening elements. An exemplary hook-to-loop engagement mechanism is described in detail below with reference to FIGS. 5A-7, though various other suitable touch fastening configurations may also be used (e.g., hook-to-hook or hook-and-pile engagements). In any case, the mating fastening elements form a releasable closure 212 between touch fasteners 208a,b that transmits a tensile load between the first and second end portions 204,206 of base 202 during a fall arrest procedure, such as described above with reference to FIGS. 1A and 1B.

Releasable closure 212 defines a shear plane 214. The term "shear plane" as used in the present disclosure refers to a geometrical plane extending along the direction of shear disengagement between the two mating touch fasteners. Shear disengagement occurs when touch fasteners 208a,b are pulled apart in a way that causes a relative sliding motion between them (e.g., a tensile force in a direction parallel to a planar base of the fasteners). Thus, shear plane 214 is oriented perpendicular to the face-to-face direction of touch fasteners 208a,b. As such, while shown in FIGS. 2A and 2B as being entirely flat, the contour of shear plane 214 follows the orientation of touch fasteners 208a,b, and therefore may curve with any bending or folding of the flexible touch fasteners. Further, because touch fasteners 20a,b are positioned in a parallel orientation relative to base 202, so too is shear plane 214.

First and second touch fasteners 208a,b are brought into engagement to form closure 212 by pulling the free standing end of first touch fastener 208a longitudinally across base 202 from first end 204 towards second end 206, which causes the intermediate portion of base 202 to fold over itself. This intermediate portion of base 202 between its opposing end portions 204,206 forms a longitudinally slack idler section 216. With tension transmitted through closure 212, idler section 216 is effectively a non-load bearing portion of base 202. The idler section 216 remains a non-load bearing component until touch fasteners 208a,b are disengaged from one another. In this way, when touch fasteners 208a,b are engaged, idler section 216 and closure 212 are longitudinally overlapping structures insofar as the idler section cannot bear a tensile load along the longitudinal direction of link 200 while closure 212 remains intact. FIG.

Figure 8:
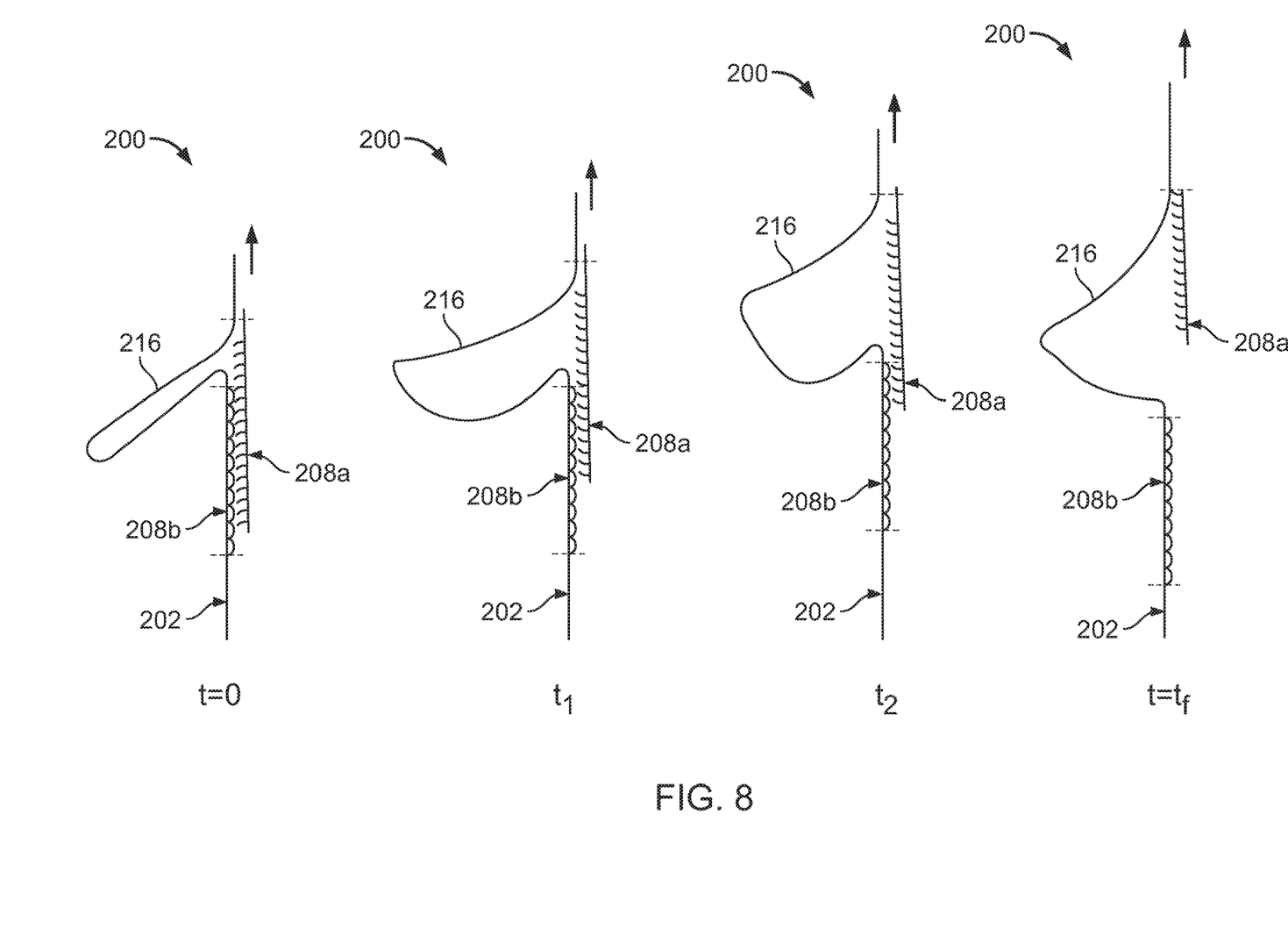
FIG. 8 is a sequence of cross-sectional diagrams progressively illustrating the release of the first energy dissipating link.

8 illustrates the progressive shear disengagement of touch fasteners 208a,b under a continually applied tensile load, such as would occur during the fall arresting procedure described above. The first illustration at $t_0$ demonstrates idler section 216 as a non-load bearing component, and the last illustration at $t_f$ demonstrates the idler section receiving the tensile load upon the shear disengagement of closure 212.

As explained in U.S. Pat. No. 4,271,566, the entirety of which is incorporated herein by reference, shear disengagement requires the concurrent release of all inter-engagements between individual mating fastening elements. Thus, the force required to disengage mated touch fasteners by shear (the "shear strength") is greater than the force required to pull them apart by progressive peeling (the "peel strength"). Further, in the current context, shear disengagement also results in greater kinetic energy dissipation (as compared to peel) because the individual fastening elements tend to re-engage as the touch fasteners slide past one another. Thus, a shear force must be exerted continually over time to fully break the closure. As discussed above, during a fall arresting procedure kinetic energy accumulated through free fall of the climber operates on the tether carrying energy dissipating link 200, which applies a tensile load to the end portions 204,206 of base 202. Touch fasteners 208a,b begin to pull apart from one another when the tensile load surpasses the shear strength of closure 212. The condition is referred to herein as a "tensile overload."

The shear strength of a typical touch-fastener closure tends to decrease during disengagement. This effect is due to the decreasing area of engagement between the touch fasteners as they are progressively pulled apart. In the present context of energy dissipation for mitigating MAF, it may be advantageous to maintain a substantially constant shear strength throughout the disengagement process. This results in an increased amount of energy dissipation per unit length. Accordingly, in some examples, one or both of touch fasteners 208a,b may have a physical characteristic that varies along shear plane 214. These varied physical characteristics may provide increasing shear fastening performance (e.g., greater shear strength per unit area) as the touch fasteners are progressively disengaged. Exemplary physical characteristics include the density of male fastening elements and/or loops, the stiffness of the male fastening elements, and/or the tenacity of the loop fibers. In some examples, the physical characteristics of touch fasteners 208a,b may vary in opposite directions. So, for example, the high density/high stiffness fastening elements of touch fastener 208a may initially engage the low density/low tenacity loops of second touch fastener 208b, and vice versa. Then, during shear disengagement, the high density/high stiffness fastening elements of touch fastener 208a progressively re-engage with the high density/tenacity loops of touch fastener 208b to maintain a substantially constant (or even increasing) shear strength.

Figure 3:
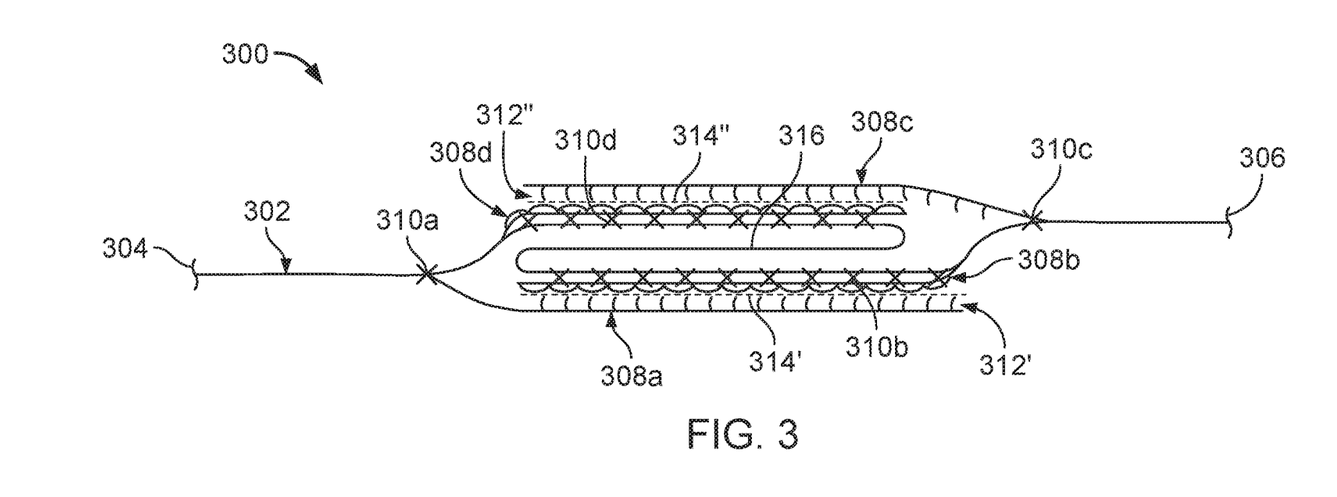
FIG. 3 is a cross-sectional diagrammatic side view of a second energy dissipating link.

FIG. 3 illustrates a second example energy dissipating link 300. Similar to link 200, link 300 includes an elongated base 302 extending continuously from a first end portion 304 to a second end portion 306. In this example, link 300 includes two separate and distinct closures 312' and 312" arranged in a stacked configuration with respective parallel shear planes 314' and 314". This stacked configuration of multiple closures with multiple shear planes may provide superior shear strength compared to a single closure with a single shear plane (as shown in FIGS. 2A and 2B, for example). Further, because the closures are stacked on top of one another, the form factor of the energy dissipating link remains longitudinally compact.

Figure 9:
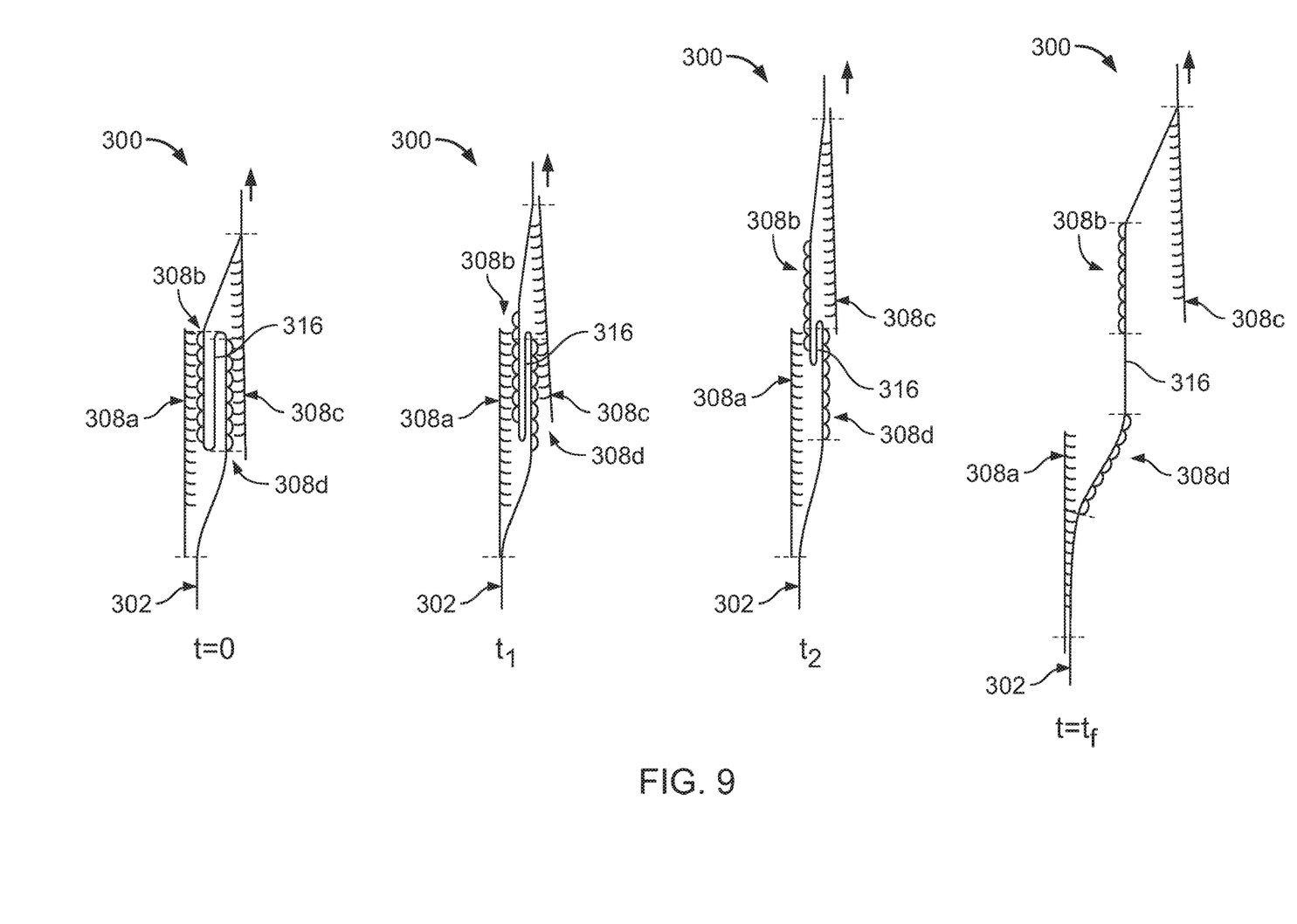
FIG. 9 is a sequence of cross-sectional diagrams progressively illustrating the release of the first energy dissipating link.

As shown, closures 312',312" are formed by respective sets of mating touch fasteners 308a,b and 308c,d. Closure 312' is formed by the engagement of first touch fastener 308a and second touch fastener 308b. Similar to the arrangement described above, first touch fastener 308a is permanently coupled at one end to base 302 by a narrow band of stitches 310a proximate first end portion 304; and second touch fastener 308b is permanently coupled at both ends to base 302 by a broad field of stitches 310b proximate second end portion 306. Closure 312" is similarly formed by the engagement of third and fourth touch fasteners 308c,d, but in an inverted configuration. That is, third touch fastener 308c is permanently coupled at one end to base 302 by a narrow band of stitches 310c proximate second end portion 306; and fourth touch fastener 308d is permanently coupled at both ends to base 302 by a broad field of stitches 310d proximate first end portion 304. Touch fasteners 308a-d are brought together into engagement to form closures 312', 312" by pulling the free standing ends of first and third touch fasteners 308a,c longitudinally across base 302 from the first and second end portions 304,306, respectively. This action causes the intermediate portion of base 302 between the end portions 304,306 to fold inwards, becoming sandwiched between the two closures 312',312" in a longitudinally overlapping fashion. Like the previously described arrangement, closures 312',312" bear the tensile load, and therefore, while intact, render the inwardly folded intermediate portion of base 302 a slack idler section 316. This progression between an engaged state ($t_0$), where closures 312',312" transmit the tensile load, and a disengaged state ($t_f$), where idler section 316 is released upon disengagement of the closures to receive the load, is illustrated in FIG. 9.

Figure 4:
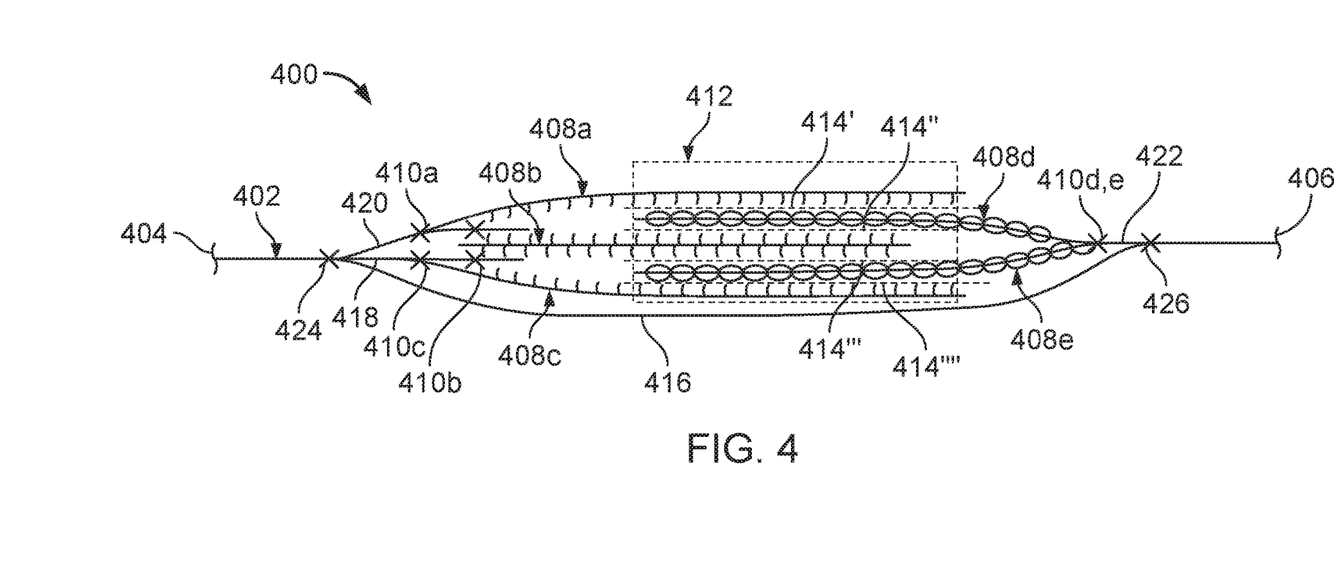
FIG. 4 is a cross-sectional diagrammatic side view of a third energy dissipating link.
Figure 10:
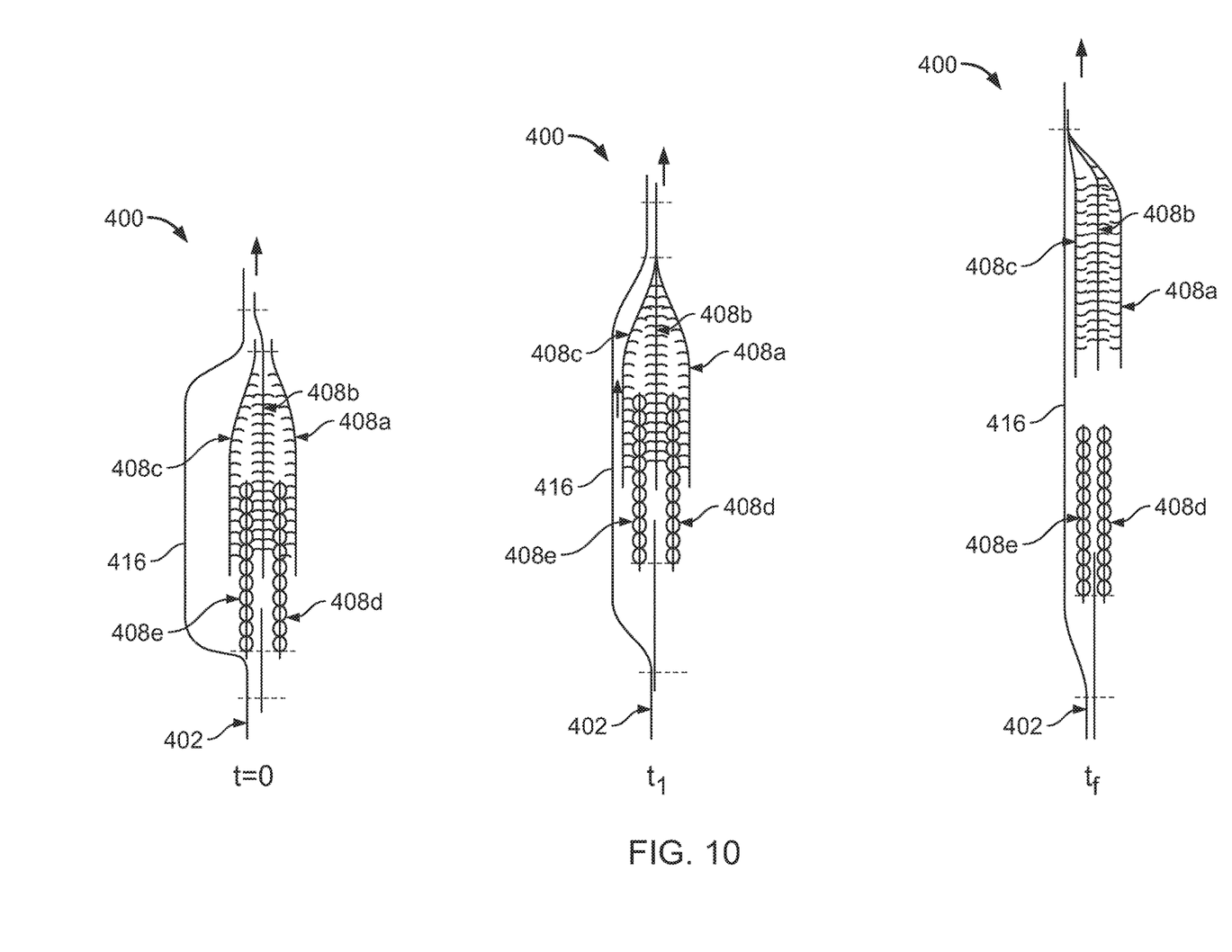
FIG. 10 is a sequence of cross-sectional diagrams progressively illustrating the release of the first energy dissipating link.

FIG. 4 illustrates a third example energy dissipating link 400. Like the prior examples, link 400 includes an elongated base 402 extending continuously between first and second end portions 404,406. Further, in this example, link 400 features a releasable closure 412 defining multiple, parallel shear planes 414',414",414"',414"". As noted above, a stacked configuration of multiple shear planes can provide a high-shear-strength link for energy dissipation having a relative compact form factor. Closure 412 is formed by the simultaneous engagement of five different touch fasteners 408a-e. As shown, each of touch fasteners 408a,b,c are permanently coupled at one end to base 402 proximate first end portion 404, with the remaining portions of the fasteners remaining free standing from the base. Two support strips 418,420 directly attached to base 402 by stitches 424 provide an intermediate link between the base and the touch fasteners. Touch fastener 408a is directly attached by a narrow band of stitches 410a to support strip 420; touch fastener 408c is directly attached by stitches 410c to support strip 418; and touch fastener 408b is sandwiched between the two support strips 418,420, attached thereto by stitches 410b. In a similar way, touch fasteners 408d,e are permanently coupled at one end to base 402 proximate second end portion 406 by an intermediate support strip 422. Support strip 422 is directly attached to base 402 by stitches 426, and touch fasteners 408d,e are directly attached to support strip 422 by stitches 410d,e. The intermediate portion of base 402 between the end portions 404,406 that support the respective touch fasteners 408a-e forms a slack idler section 416 when closure 412 is intact. The progressive illustrations of FIG. 10 demonstrate the transition between the engaged ($t_0$) and disengaged ($t_f$) states of closure 412 by shear.

Touch fasteners 408a-e are brought into engagement by pulling the free ends of fasteners 408a,b,c longitudinally across base 402 from first end portion 404, and/or by pulling the free ends of fasteners 408d,e from the second end portion 406. Here, the multiple shear planes 414',414",414'",414"" are formed in a single interconnected closure using double-sided fasteners. That is, touch fasteners 408b,d,e support a field of fastening elements on both their upper and lower planar faces, facilitating respective engagements with two other touch fasteners. Similar to the previously described arrangements, hook-to-loop engagement interfaces are used in this example. This particular configuration includes an array of hooks provided on single-sided first touch fastener 408a. The hooks of touch fastener 408 interface with a field of loops provided on the upper face of double-sided fourth touch fastener 408d. The field of loops provided on the lower face of touch fastener 408d interface with an array of hooks provided on the upper face of double-sided second touch fastener 408b. The array of hooks provided on the lower face of touch fastener 408b interface with a field of loops provided on the upper face of double-sided fifth touch fastener 408e. And, the field of loops provided on the lower face of touch fastener 408e interface with an array of hooks provided on single-sided third touch fastener 408c. While this particular arrangement provides the advantages described above of increased energy dissipation from enhanced shear strength in a longitudinally compact form factor, other suitable stacks of mating fastening elements can also be implemented within the scope of the present disclosure.

FIGS. 5A-6B illustrate example fastening elements, J-hook structures in particular, that can be used in hook-and-loop touch-fastening closures. These and various other types of suitable fastening elements (such as palm tree, trilobal hooks, or mushroom-type fastening elements) can be implemented in the energy dissipating links described throughout this disclosure. U.S. Pat. Nos. 6,960,314 and 7,716,792, the entireties of which are incorporated herein by reference, describe various types of suitable fastening hook structures.

Figure 5A:
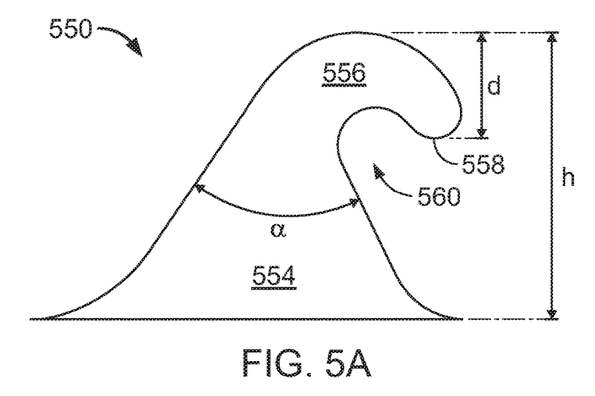
FIGS. 5A and 5B are side and end views of a first J-shaped hook.
Figure 5B:
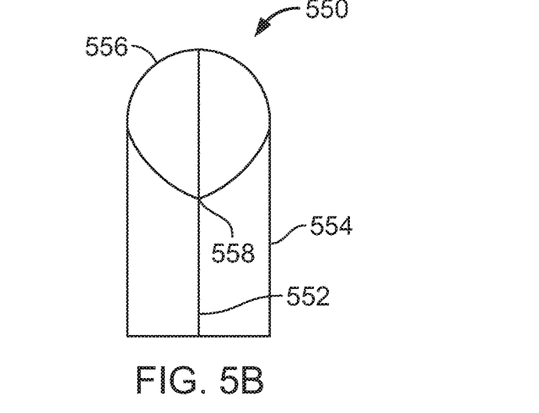
Figure 6A:
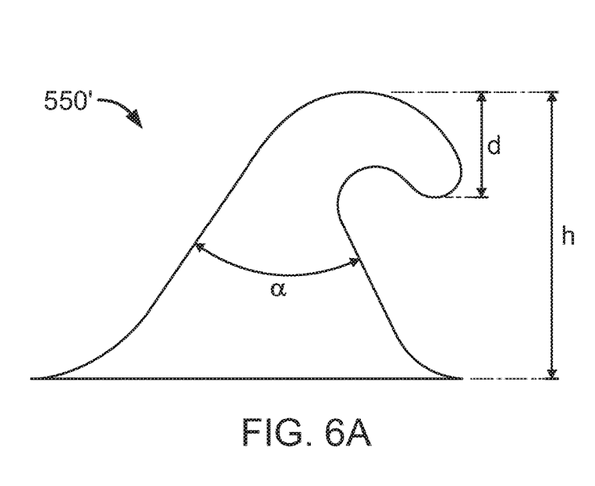
FIGS. 6A and 6B are side and end views of a second J-shaped hook.
Figure 6B:
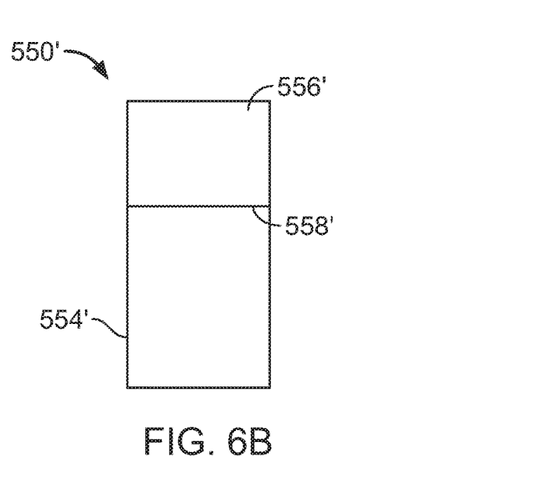

The hook 550 of FIGS. 5A and 5B has a J-shaped profile and curved sides, such as may be molded in a cavity formed between two adjacent mold plates in a mold roll employed in the Fischer process described in U.S. Pat. No. 4,794,028, leaving a parting line 552 down the middle of the hook at the interface between the two mold plates. The pedestal stem portion 554 defines a rather large included angle α (e.g., about 61.5 degrees) between front and rear edges. The head portion 556 has a re-entrant tip 558, meaning that it extends downward toward the base of the hook to form a concave crook 560 for entrapping loop fibers. The tip 558 extends downward to a distance "d" from the most upper surface of the hook, and the entire hook has an overall height "h", as measured normal to the base. The hook 550' of FIGS. 6A and 6B also has a J-shaped profile, but has flat sides as seen in FIG. 6B. Thus, its tip 558' extends completely across the hook, and the upper surface of its head portion 556' presents a rather broad surface to the mating material. The stem portion 554' defines the same included angle α, the tip 558' also extends down to a distance "d", and the hook 550' also has an overall height "h".

Figure 7:
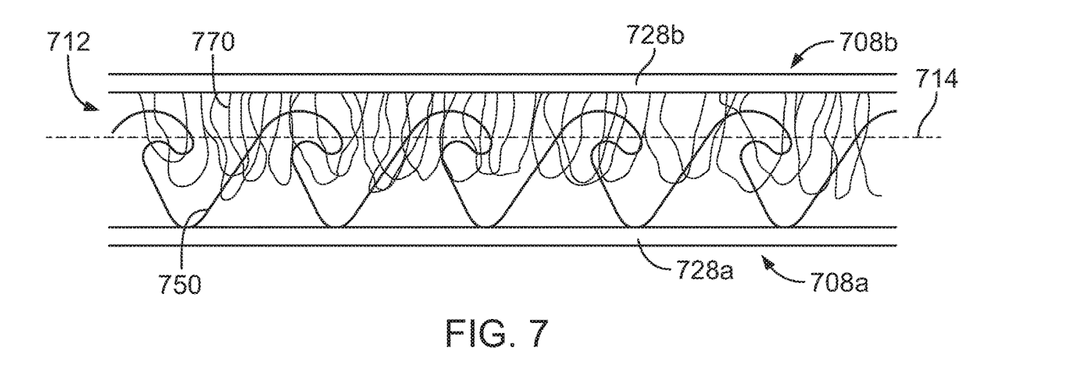
FIG. 7 is a side view of an engagement interface between mating touch fasteners.

FIG. 7 illustrates an example closure 712 formed between first and second mating touch fasteners 708a,b. As shown, first touch fastener 708a includes an array of J-hook fastening elements 750 formed on a base 728a; and second touch fastener 708b includes a field of loop material 770 formed on a base 728b. Touch fasteners 708a,b are shown here in an engaged state, with the loops 770 of touch fastener 708b trapped within the concave crooks of hooks 750 carried on touch fastener 708a. The engaged hooks 750 and loops 770 can be disengaged in shear by pulling touch fasteners 708a,b apart from one another along the shear plane 714. When the applied tensile force reaches the tensile strength of the closure 712, hooks 750 deform and/or loops 770 sever to release the loops from the crooks of the hooks. In some implementations, it may be advantageous to design the hook-and-loop system such that the hooks deform at a lower tensile load than the loops (i.e., a hook-limited closure), which allows the loops to re-engage with other hooks during the shearing motion, thereby increasing the amount of energy dissipation.

In this example, the array of J-hook fastening elements 750 are arranged in parallel rows along the base 728a of first touch fastener 708a. As shown, fastening elements 750 are arranged with the head portions oriented in the same direction, forming a one-way hook configuration. An array of "one-way hooks" is characterized by at least a majority of the discrete fastener elements being provided as hook structures with head portions that extend forward from the stem in a common direction. Touch fasteners featuring one-way hooks present significant shear strength when pulled in a direction opposing the directed re-entrant tip of the head, and little to no shear strength when pulled in the opposite direction. One-way hooks can be particularly advantageous in the present context because they permit manual resetting of the energy dissipating link by simply sliding the touch fasteners back to the original engaged position along the shear plane.

A number of embodiments of the invention have been described. Nevertheless, it will be understood that various modifications may be made without departing from the spirit and scope of the inventions. For example, while the energy dissipating links described above have been illustrated in the context of a fall arresting system, various other implementations are also contemplated (e.g., seatbelts or straps). As another example, while the male fastening elements described above are manufactured by a molding technique, woven hook-and-loop touch fasteners are also suitable for use in conjunction with the energy dissipating links of this disclosure. U.S. Pat. No. 5,996,189, the entirety of which is incorporated herein by reference, describes an exemplary process for producing woven hooks and loops. In some implementations—e.g., where the touch fasteners are integrated with the supporting base of the link—woven hook-and-loop fasteners may be particularly advantageous because the fields of fastening elements can be formed by weaving directly into the base strap. As described in U.S. Pat. No. 5,996,189, multi-filament yarns interlaced with the base strap can be used to form loops, and mono-filament yarns can be processed (e.g., heat set and cut) to form hooks.

What is claimed is:

1. An energy dissipating link for a tether, the link comprising:
   an elongated base having opposite, first and second end portions;
   a first touch fastener permanently coupled to the base proximate the first base end portion; and
   a second touch fastener permanently coupled to the base proximate the second base end portion, the second touch fastener engageable with the first touch fastener to form a releasable closure defining a shear plane,
   wherein, with the first and second touch fasteners engaged to transmit a tensile load between the first and second end portions, and with the engaged touch fasteners loaded in shear in the shear plane, the base comprises a longitudinally slack idler section within an intermediate portion of the base between the first and second touch fasteners in a longitudinal direction of the base; and wherein the idler section of the base is configured to transmit tensile load upon an energy-dissipating shear disengagement of the first and second touch fasteners along the shear plane by a tensile overload.

2. The energy dissipating link of claim 1, wherein the longitudinally slack idler section of the base at least partially longitudinally overlaps the closure.

3. The energy dissipating of claim 1, wherein the first touch fastener comprises an array of discrete fastening elements, each fastening element comprising an upstanding stem extending outwardly from the base and a head extending integrally from a distal end of the stem to a tip.

4. The energy dissipating link of claim 3, wherein the second touch fastener comprises a field of loops, and wherein the heads of the fastening elements comprise a lower surface forming a crook for retaining the loops.

5. The energy dissipating link of claim 3, wherein a majority of the discrete fastening elements comprise one-way hooks, with the head of each fastening element of the majority extending forward from the stem in the same direction.

6. The energy dissipating link of claim 1, wherein a physical characteristic of at least one of the first and second touch fasteners varies along the shear plane, such that the shear strength of the closure remains at least substantially constant throughout a portion of the energy-dissipating shear disengagement.

7. The energy dissipating link of claim 6, wherein the physical characteristic comprises at least one of density or tenacity of engagement.

8. The energy dissipating link of claim 1, wherein the idler section of the base is spaced from the first and second touch fasteners by a longitudinal distance along the base.

9. The energy dissipating link of claim 1, wherein one longitudinal end of the first touch fastener is directly attached to the base and the remainder of the first touch fastener is free standing relative to the base, such that, under the tensile overload between the first and second end portions of the base, the energy-dissipating shear disengagement comprises an opposite free-standing end of the first touch fastener being disengaged by shear from the second touch fastener.

10. The energy dissipating link of claim 1, wherein the closure formed by engagement of the first and second touch fasteners is a first closure, and further comprising a second releasable closure carried on the base and spaced from the first closure.

11. The energy dissipating link of claim 1, wherein the shear plane comprises a first shear plane, and further comprising one or more additional touch fasteners forming at least a second shear plane of the closure, the shear planes arranged in parallel, such that, under the tensile overload between the first and second end portions of the base, the engaged fastening components are released simultaneously.

12. The energy dissipating link of claim 11, wherein the idler section of the base at least partially longitudinally overlaps both the first and second closures.

13. A flexible energy dissipating link for a tether, the link comprising:
an elongated and flexible base having first and second longitudinal end portions; and
a plurality of flexible touch fasteners permanently coupled to the flexible base between the first and second end portions, each touch fastener engaged with at least one other of the touch fasteners to define a closure having multiple parallel shear planes in which the engaged touch fasteners are simultaneously loaded in response to a tensile load applied along the link at the first and second end portions, and
wherein the engaged touch fasteners are configured to disengage by shear along the multiple shear planes in response to a tensile overload between the first and second end portions of the base.

14. The energy dissipating link of claim 13, wherein at least one of the plurality of touch fasteners comprises a double-sided structure carrying fastening elements on both an upper and lower planar face.

15. The energy dissipating link of claim 14, wherein the fastening elements on the upper and lower planar faces comprise fields of discrete hook structures comprising an upstanding stem extending outwardly from the base and a head extending integrally from a distal end of the stem to a tip, a majority of the discrete hook structures comprising one-way hooks, with the head of each hook structure of the majority extending forward from the stem in the same direction.

16. The energy dissipating link of claim 13, wherein one longitudinal end of a first of the plurality of touch fasteners is directly attached to the base and the remainder of the first touch fastener is free standing relative to the base.

17. An energy dissipating link for a tether, the link comprising:
an elongated and flexible base having opposite, first and second end portions spaced from one another by a longitudinal distance along the base;
a first touch fastener permanently attached to the base solely by a first coupling located entirely within the first end portion of the base; and
a second touch fastener permanently attached to the base solely by a second coupling located entirely within the second end portion of the base,
wherein the first and second couplings are spaced from one another by at least the longitudinal distance, and
wherein the second touch fastener is engaged with the first touch fastener to form a releasable closure comprising a longitudinal shear plane, the engaged touch fasteners configured to disengage by shear along the shear plane in response to a tensile overload between the first and second end portions of the base.

18. The energy dissipating link of claim 17, wherein the first touch fastener comprises an array of discrete fastening elements, each fastening element comprising an upstanding stem extending outwardly from the base and a head extending integrally from a distal end of the stem to a tip, the second touch fastener comprising a field of loops, and wherein the heads of the fastening elements comprise a lower surface forming a crook for retaining the loops.

19. The energy dissipating link of claim 17, wherein one longitudinal end of the first touch fastener is directly attached to the base and the remainder of the first touch fastener is free standing relative to the base.

20. The energy dissipating link of claim 17, wherein the closure formed by engagement of the first and second touch fasteners is a first closure, and further comprising a second releasable closure carried on the base and spaced from the first closure.

\* \* \* \* \*

UNITED STATES PATENT AND TRADEMARK OFFICE
CERTIFICATE OF CORRECTION

PATENT NO. : 10,537,758 B2
APPLICATION NO. : 15/840196
DATED : January 21, 2020
INVENTOR(S) : Carlos Sáez Comet Page 1 of 1

It is certified that error appears in the above-identified patent and that said Letters Patent is hereby corrected as shown below:

In the Claims

Column 11, Claim 3, Line 11, after "dissipating" insert --link--.

Signed and Sealed this
Twenty-sixth Day of May, 2020

Andrei Iancu
*Director of the United States Patent and Trademark Office*